US012812056B2

(12) United States Patent
Koyama et al.

(10) Patent No.: US 12,812,056 B2
(45) Date of Patent: Nov. 24, 2026

(54) IMAGE SCANNING DEVICE

(71) Applicant: SEIKO EPSON CORPORATION, Tokyo (JP)

(72) Inventors: Hiroki Koyama, Asahi-mura (JP); Masakazu Ishihara, Matsumoto (JP); Toshimitsu Ohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 288 days.

(21) Appl. No.: 18/612,782

(22) Filed: Mar. 21, 2024

(65) Prior Publication Data

US 2024/0323296 A1 Sep. 26, 2024

(30) Foreign Application Priority Data

Mar. 24, 2023 (JP) ................................ 2023-047848

(51) Int. Cl.
*H04N 1/10* (2006.01)
*H04N 1/024* (2006.01)
*H04N 1/12* (2006.01)

(52) U.S. Cl.
CPC ......... *H04N 1/1061* (2013.01); *H04N 1/0249* (2013.01); *H04N 1/1215* (2013.01); *H04N 2201/0094* (2013.01)

(58) Field of Classification Search
CPC .. H04N 1/1061; H04N 1/0249; H04N 1/1215; H04N 2201/0094
See application file for complete search history.

(56) References Cited

U.S. PATENT DOCUMENTS

2011/0228285 A1* 9/2011 Kohara ................ G03G 15/502 358/1.2
2018/0205845 A1* 7/2018 Wilsher ................ H04N 1/122
2019/0327376 A1 10/2019 Miyakoshi

FOREIGN PATENT DOCUMENTS

JP 2019-189383 A 10/2019

OTHER PUBLICATIONS

NPL: InnovationQ+ by IP.com and IEEE: Results Publication Date Range: Feb. 10, 1990 to Nov. 26, 2025.*

(Continued)

*Primary Examiner* — Quang N Vo
(74) *Attorney, Agent, or Firm* — WORKMAN NYDEGGER

(57) ABSTRACT

An image scanning device includes a transport section that transports a document along a transport path; an image scanning unit that is configured to scan an image from the document transported by the transport section; and a first conductive section that is configured to electrically conduct with the image scanning unit. The image scanning unit has a scanning section that is configured to scan the image from the document transported by the transport section, a glass plate that is configured to contact with the document between the scanning section and the transport path, and a second conductive section that is configured to electrically conduct with the glass plate. The image scanning unit is configured to displace along a displacement direction that intersects the transport path. The first conductive section is configured to follow the displacement of the image scanning unit and to maintain electrical conductivity with the glass plate by maintaining a state where the first conductive section is in contact with the second conductive section by following the displacement of the image scanning unit.

8 Claims, 5 Drawing Sheets

(56) References Cited

OTHER PUBLICATIONS

NPL: InnovationQ+ by IP.com and IEEE, Results Publication Date Range: Feb. 12, 2004 to Feb. 18, 2026.*

* cited by examiner

IMAGE SCANNING DEVICE

The present application is based on, and claims priority from JP Application Serial Number 2023-047848, filed Mar. 24, 2023, the disclosure of which is hereby incorporated by reference herein in its entirety.

BACKGROUND

1. Technical Field

The present disclosure relates to an image scanning device.

2. Related Art

For example, JP-A-2019-189383 discloses an image scanning device that is equipped with an image scanning unit that is capable of scanning images from a document being transported. The image scanning unit has a glass plate that can be in contact with the document and a scanning section that can scan an image from the document through the glass plate. In such an image scanning device, the glass plate is grounded by contacting a conductive section to the glass plate in order to suppress the charging of the glass plate that comes in contact with the transported document.

However, in such an image scanning device, it is desirable to properly suppress charging on the glass plate in case the image scanning unit itself can be displaceable for adjusting a position of the image scanning unit.

SUMMARY

The image scanning device that solves the above problem includes a transport section that transports a document along a transport path; an image scanning unit that is configured to scan an image from the document transported by the transport section; and a first conductive section electrically conductible with the image scanning unit, wherein the image scanning unit has a scanning section that is configured to scan the image from the document transported by the transport section, a glass plate that is configured to contact the document between the scanning section and the transport path, a and second conductive section electrically conductive with the glass plate, the image scanning unit is configured to displace along a displacement direction that intersects the transport path, and the first conductive section is configured to follow a displacement of the image scanning unit and to maintain electrical conductivity with the glass plate by maintaining a state where the first conductive section is in contact with the second conductive section by following the displacement of the image scanning unit.

DESCRIPTION OF EMBODIMENTS

First Embodiment

Hereinafter, an embodiment of a multifunction device that includes an image scanning device will be described. In the following description, a direction intersecting a vertical direction Z is a left-right direction X, and a direction intersecting the vertical direction Z and the left-right direction X is a width direction Y. The width direction Y is a direction that corresponds to a width of a document being transported. One direction along the left-right direction X is defined as a left direction X1, and the other direction along the left-right direction X is defined as a right direction X2. One direction along the width direction Y is defined as a first width direction Y1, and the other direction along the width direction Y is defined as a second width direction Y2. An upper direction of the vertical direction Z is defined to as an upper side Z1, and the lower direction of the vertical direction Z is defined as a lower side Z2.

Multifunction Device 10

Figure 1:
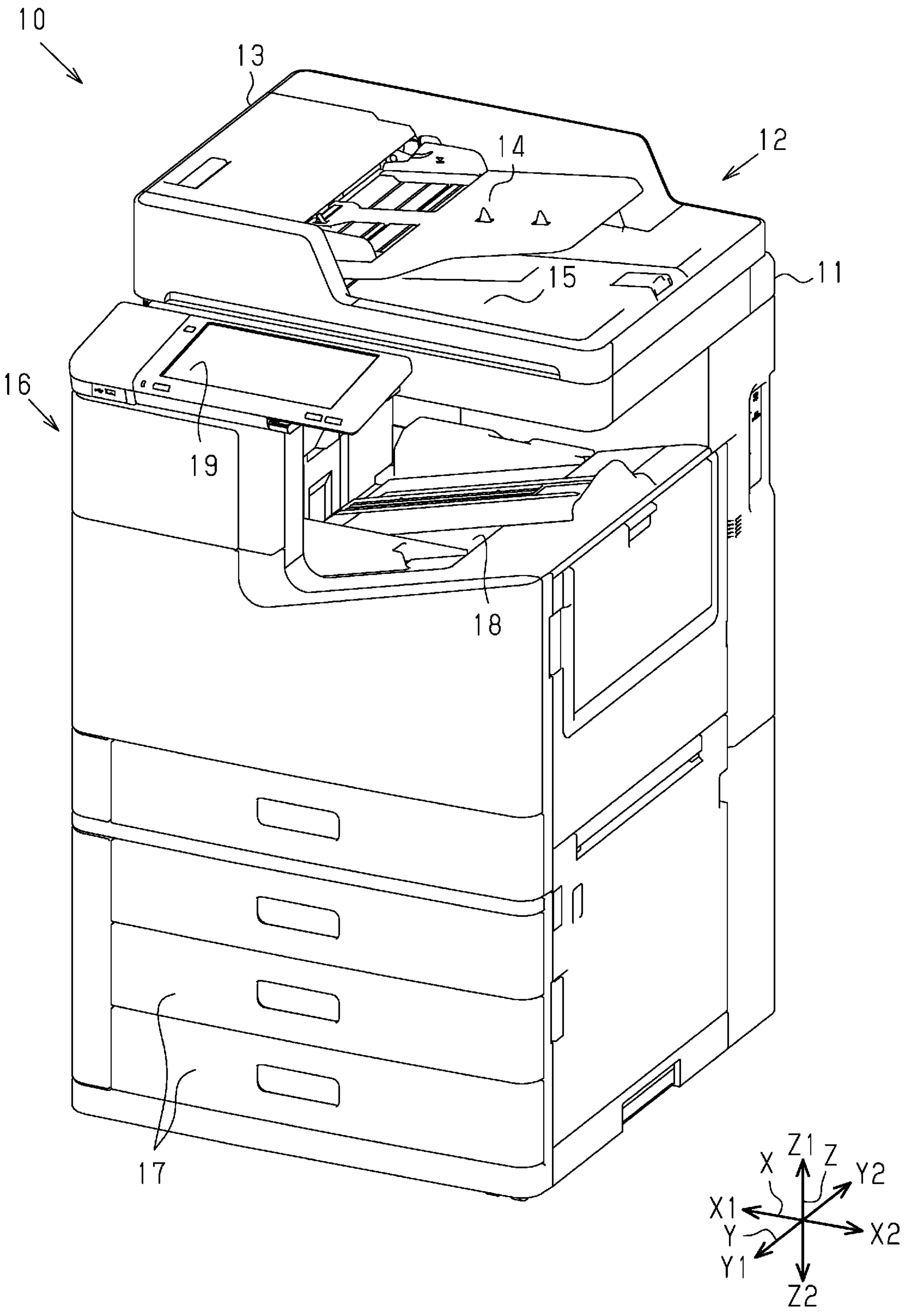
FIG. 1 is a perspective diagram showing the multifunction device.

As shown in FIG. 1, the multifunction device 10 has a recording function that performs recording on a medium and a scanning function that an image from a document. The multifunction device 10 is equipped with a main body housing 11. The main body housing 11 can accommodate various members. The multifunction device 10 is equipped with an image scanning device 12. The image scanning device 12 is configured to scan an image from a document.

The image scanning device 12 may be equipped with an automatic feeding section 13. The automatic feeding section 13 is located in the upper side Z1 of the main body housing 11. The automatic feeding section 13 may be configured to open and close with respect to the main body housing 11. The automatic feeding section 13 is configured to feed a document. The automatic feeding section 13 is configured to feed a plurality of documents one by one.

The automatic feeding section 13 has a feed tray 14. The feed tray 14 can be used to place a document before it is scanned. Specifically, the feed tray 14 is capable of placing a plurality of pre-scanned documents. The automatic feeding section 13 has a discharge tray 15. The discharge tray 15 can be used to place the document after it is scanned.

The multifunction device 10 may be equipped with a recording device 16. The recording device 16 is configured to perform recording on a medium. The recording device 16 has a medium accommodation section 17. The medium accommodation section 17 can store a medium before recording. The recording device 16 has a stacker 18. The stacker 18 can be used to place a medium after recording.

The multifunction device 10 may be equipped with a touch panel 19. The touch panel 19 is an operation section that can be operated by the user. The touch panel 19 is a display section that displays information about the multifunction device 10. The operation section and the display section may be provided separately.

Image Scanning Device 12

Figure 2:
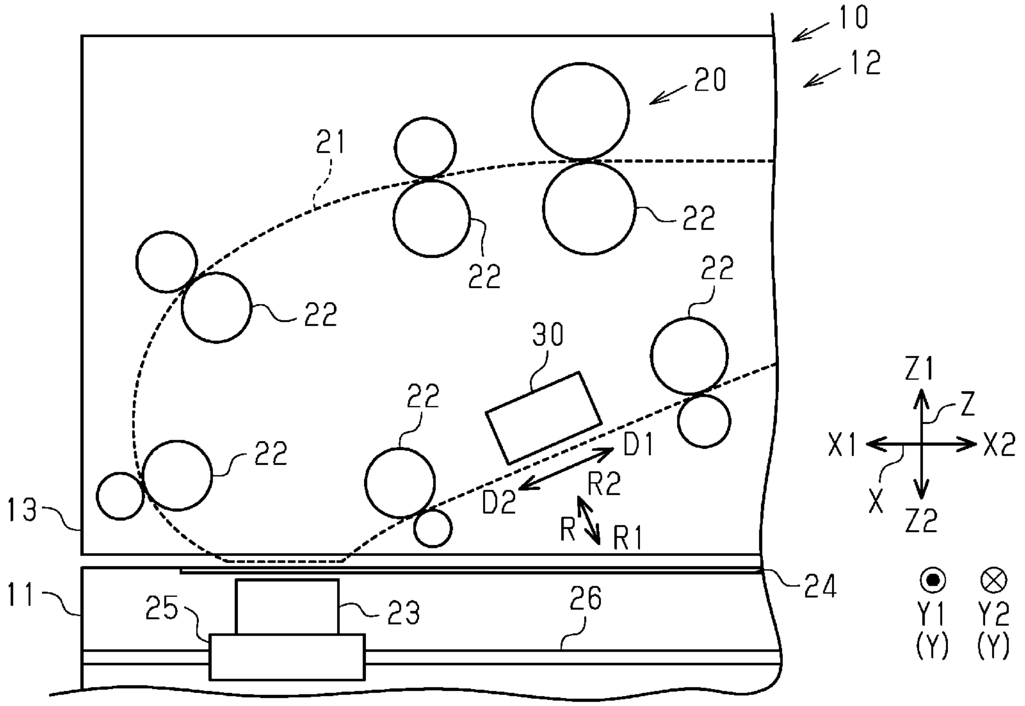
FIG. 2 is a schematic diagram showing an image scanning device.

As shown in FIG. 2, the image scanning device 12 has a transport section 20. Specifically, the automatic feeding section 13 has the transport section 20. The transport section 20 feeds the document placed on the feed tray 14 one by one into a transport path 21. The transport section 20 transports the document along the transport path 21. The transport section 20 discharges the document transported along the transport path 21 to the discharge tray 15. The transport section 20 has a plurality of rollers 22 for transporting the document.

The image scanning device 12 has a first image scanning unit 23. The first image scanning unit 23 is housed in the main body housing 11. The first image scanning unit 23 is located along the transport path 21 and facing the upper surface of the main body housing 11. The first image scanning unit 23 can scan images from a document being transported by the transport section 20. In particular, the first image scanning unit 23 is configured to scan an image from a front surface of the document. The first image scanning unit 23 extends along the width direction Y.

The image scanning device 12 has a first document glass 24. The first document glass 24 is located on an upper surface of the main body housing 11. The first image scanning unit 23 is configured to scan an image from a document through the first document glass 24.

The image scanning device 12 may have a carriage 25 and a guide member 26. The carriage 25 holds the first image scanning unit 23. The carriage 25 is movable along the guide member 26. The guide member 26 extends along the left-right direction X. As the carriage 25 moves along the guide member 26, the first image scanning unit 23 moves in the left-right direction X.

The image scanning device 12 has a second image scanning unit 30. Specifically, the automatic feeding section 13 has the second image scanning unit 30. The second image scanning unit 30 is provided at a position along the transport path 21. The second image scanning unit 30 is provided so that it is facing the transport direction D1 and is inclined upward to upper side Z1. Therefore, in the automatic feeding section 13, the space for arranging components is more sufficient in a portion in the transport direction D1 side of the second image scanning unit 30 than in a portion in an opposite direction D2 side, which is opposite from the transport direction D1, of the second image scanning unit 30. The transport direction D1 is a direction in which the document is transported in an area where the second image scanning unit 30 is facing. The opposite direction D2 is a direction which is opposite to the transport direction D1.

The second image scanning unit 30 can scan an image from a document being transported by the transport section 20. In particular, the second image scanning unit 30 is configured to scan the image from a back surface of the document. The second image scanning unit 30 extends in the width direction Y. The second image scanning unit 30 corresponds to an example of an image scanning unit.

Second Image Scanning Unit 30

Figure 3:
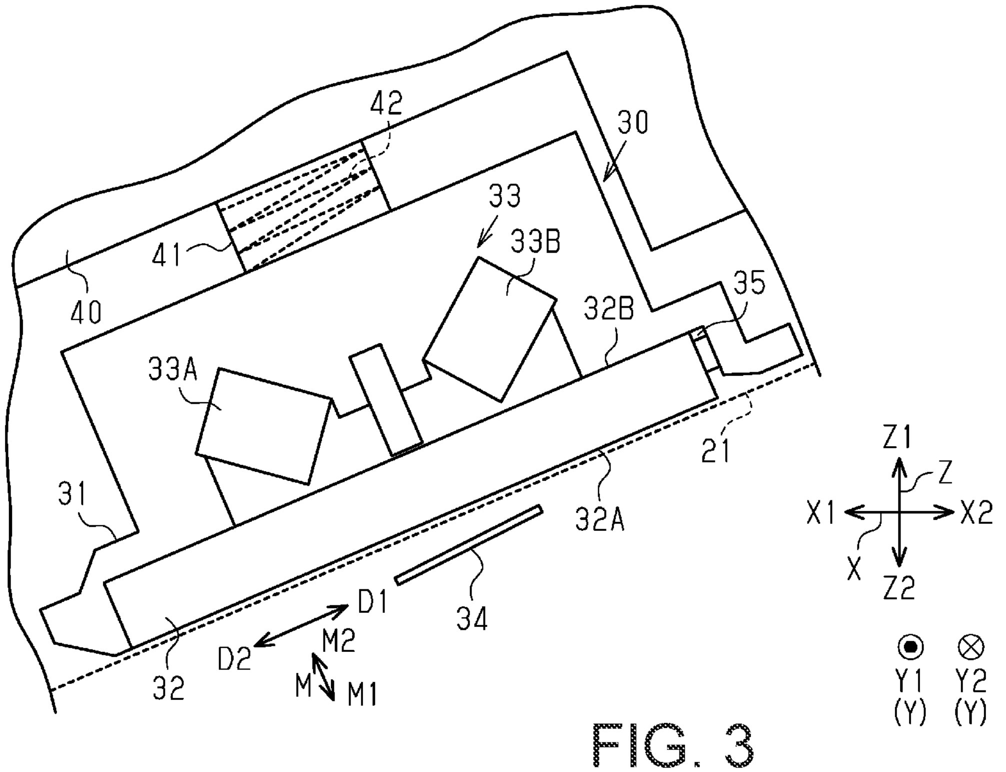
FIG. 3 is a sectional diagram showing a second image scanning unit.

As shown in FIG. 3, the second image scanning unit 30 has a unit housing 31, a second document glass 32, and a scanning section 33. The unit housing 31 is configured to hold the second document glass 32 and the scanning section 33. The unit housing 31 may be made of resin. In other words, the unit housing 31 is configured so that it is not electrically conductive to the second document glass 32.

The second document glass 32 is provided at a position along the transport path 21. The second document glass 32 can contact the document between the scanning section 33 and the transport path 21. The second document glass 32 is an example of a glass plate.

The second document glass 32 has a contact surface 32A. The contact surface 32A is a surface facing the transport path 21. The contact surface 32A is a surface that can be in contact with the document. The second document glass 32 has a back surface 32B. The back surface 32B is a back surface of the contact surface 32A. The back surface 32B is a surface that is not in contact with the document.

The scanning section 33 can scan an image from the document being transported by the transport section 20. The scanning section 33 has a light emitting section 33A and a light receiving section 33B. The light emitting section 33A is a light source that can irradiate light onto the document being transported in the transport path 21. The light emitting section 33A may be composed of an LED, fluorescent lamp, and the like, for example.

The light receiving section 33B receives reflected light, which is irradiated from the light emitting section 33A and then reflected by the document. The light receiving section 33B may be an image sensor. The light receiving section 33B converts the light received by each photoelectric conversion element into an electrical signal, and outputs a pixel signal with a value corresponding to the amount of the light received. As described above, the second image scanning unit 30 is configured to scan images from the document through the second document glass 32.

The second image scanning unit 30 is capable of displacing along the displacement directions M. The second image scanning unit 30 may be able to move forward and backward with respect to the transport path 21. The displacement direction M is a direction that intersects the width direction Y and the transport direction D1. Of the displacement directions M, a direction toward the transport path 21 is a first displacement direction M1, and a direction opposite to the first displacement direction M1 is a second displacement direction M2.

The image scanning device 12 has a background plate 34. The background plate 34 is provided at a position that is facing the scanning section 33 across the transport path 21. The background plate 34 reflects light irradiated from the light emitting section 33A and enters it into the light receiving section 33B. The background plate 34 may be white or gray.

The image scanning device 12 has a holding section 40. Specifically, the automatic feeding section 13 has the holding section 40. The holding section 40 can hold the second image scanning unit 30. The holding section 40 can hold the second image scanning unit 30 so that the contact surface 32A is exposed. The holding section 40 may be a resin member. In other words, the holding section 40 is configured so that it is not electrically conductive to the second document glass 32.

The holding section 40 has an elastic holding section 41. The elastic holding section 41 extends toward the first displacement direction M1. The elastic holding section 41 may be provided at both end portions in the width direction Y of the second image scanning unit 30.

The image scanning device 12 has an elastic member 42. The elastic member 42 is held by the elastic holding section 41. In other words, the elastic holding section 41 can hold the elastic member 42. The elastic member 42 may be a coil spring. The elastic member 42 biases the second image scanning unit 30 toward the first displacement direction M1.

By this, the second image scanning unit 30 is displaceable toward the first displacement direction M1 by the elastic force of the elastic member 42. In other words, the holding section 40 is configured to hold the second image scanning unit 30 displaceably.

The second image scanning unit 30 is positioned with respect to the displacement directions M by the unit housing 31 contacting a contact surface (not shown). The contact surface is located outside area of the transport path 21. In this way, the second image scanning unit 30 is positioned to secure the transport path 21 and to be in an appropriate positional relationship with the transport path 21.

Figure 4:
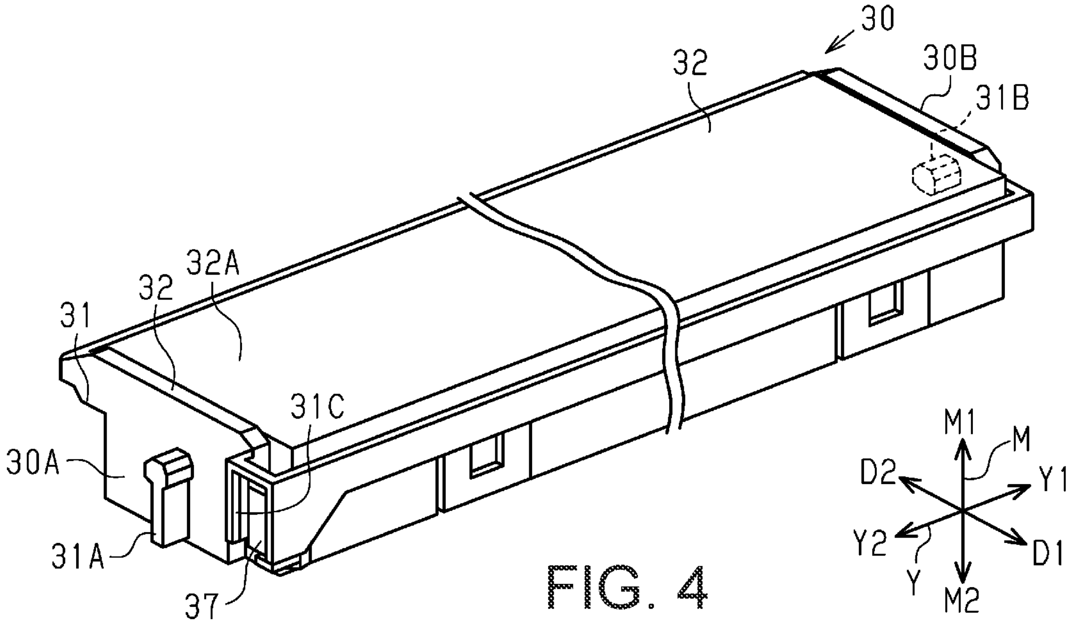
FIG. 4 is a perspective diagram showing the second image scanning unit.

As shown in FIG. 4, the second image scanning unit 30 has one end portion 30A and the other end portion 30B as both end portions in the width direction Y. The one end portion 30A is located in the second width direction Y2 side. The other end portion 30B is located in the first width direction Y1 side. The second width direction Y2 corresponds to an example of a first intersection direction among intersection directions that intersects the displacement directions M. The first width direction Y1 corresponds to an example of a second intersection direction among the intersection directions that intersects the displacement directions M. The second intersection direction is a direction opposite to the first intersection direction.

The unit housing 31 has a first engagement portion 31A. The first engagement portion 31A is provided on the second width direction Y2 side of the unit housing 31. The first engagement portion 31A may be provided so as to protrude in the second width direction Y2 side of the unit housing 31. The first engagement portion 31A is a portion that is used to attach the one end portion 30A to the holding section 40.

The unit housing 31 has a second engagement portion 31B. The second engagement portion 31B is provided on the first width direction Y1 side of the unit housing 31. The second engagement portion 31B may be provided so as to protrude in the first width direction Y1 side of the unit housing 31. The second engagement portion 31B is a portion that is used to attach the other end portion 30B to the holding section 40.

The unit housing 31 has a notch portion 31C. The notch portion 31C is located on the second width direction Y2 side of the unit housing 31. The notch portion 31C opens toward the second width direction Y2. The notch portion 31C extends in the displacement directions M. In other words, the notch portion 31C is provided so that a length in the displacement directions M is longer than a length in the transport direction D1. The notch portion 31C is located in the transport direction D1 side of the unit housing 31, as viewed from the first displacement direction M1 side. The notch portion 31C is a portion that exposes the contacted section 37 from the unit housing 31.

Figure 5:
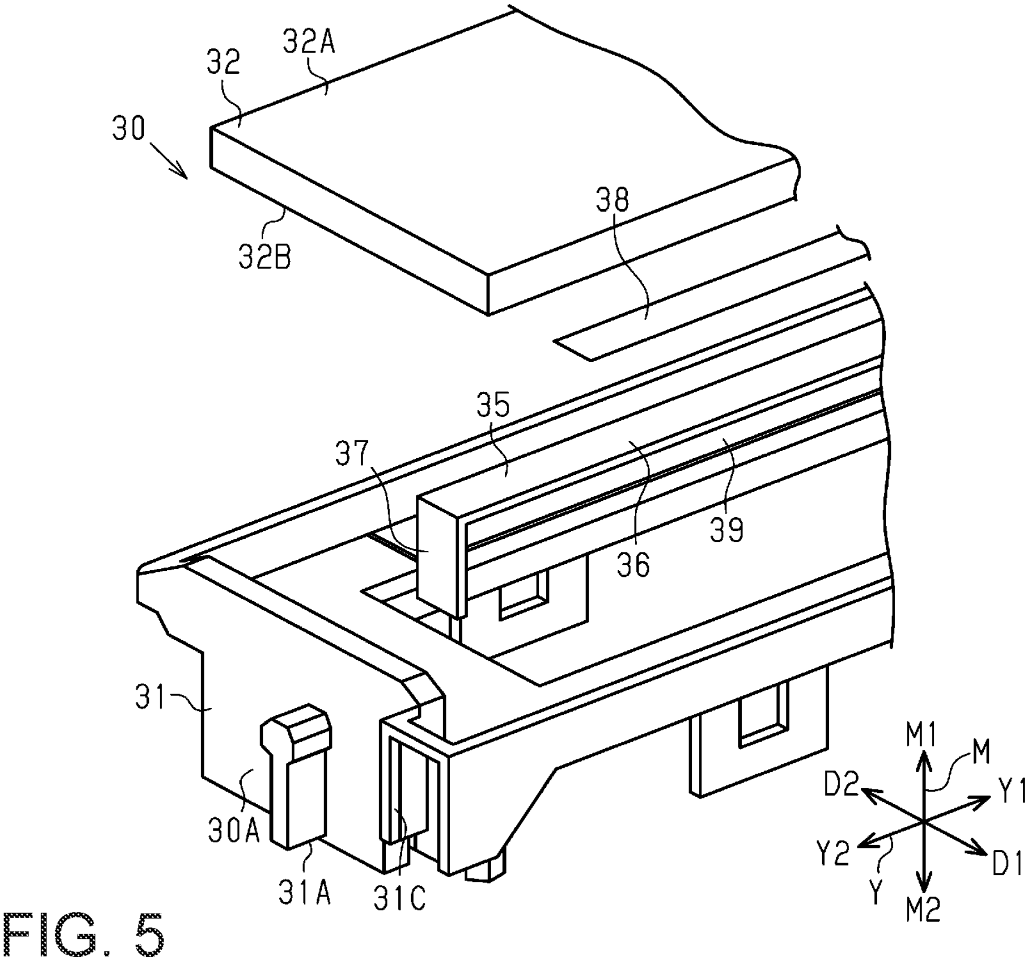
FIG. 5 is another perspective diagram showing the second image scanning unit.

As shown in FIG. 5, the second image scanning unit 30 has a second conductive section 35. In other words, the image scanning device 12 has the second conductive section 35. The second conductive section 35 is housed in the unit housing 31. As described above, the unit housing 31 is configured to house at least the second conductive section 35.

The second conductive section 35 is located in the transport direction D1 side of the unit housing 31, as viewed from the first displacement direction M1 side. The second conductive section 35 has an L-shape as viewed from the transport direction D1 side. The second conductive section 35 is made of metal. The second conductive section 35 may be a sheet metal member. The second conductive section 35 electrically conducts to the second document glass 32.

The second conductive section 35 has a ground section 36. The ground section 36 extends in the width direction Y. Specifically, the length of the ground section 36 in the width direction Y may be the same as the length of the second document glass 32 in the width direction Y. The second conductive section 35 is attached to the back surface 32B of the second document glass 32 by a conductive double-sided tape 38. The ground section 36 electrically conducts the second document glass 32 over the entire width of the second document glass 32 in the width direction Y.

The second conductive section 35 has a contacted section 37. The contacted section 37 extends from an end portion of the ground section 36 in the second width direction Y2 toward the second displacement direction M2. In other words, the contacted section 37 is provided so that a length in the displacement directions M is longer than a length in the transport direction D1. When the second conductive section 35 is housed in the unit housing 31, the contacted section 37 exposes from the unit housing 31 through the notch portion 31C. Specifically, the contacted section 37 exposes from the unit housing 31 in the second width direction Y2 side. In particular, the contacted section 37 exposes from the unit housing 31 in the second width direction Y2 side and in the transport direction D1 side.

The second document glass 32 is attached to the unit housing 31 by a double-sided tape 39. The double-sided tape 39 is a non-conductive tape, but may be a conductive tape. In particular, the second document glass 32 is attached to the unit housing 31 in the transport direction D1 side by a double-sided tape (not shown) so that the second conductive section 35 is sandwiched between the second document glass 32 and the unit housing 31.

As shown in FIG. 6 and FIGS. 8 to 10, the holding section 40 has an attachment section 43. In other words, the automatic feeding section 13 has the attachment section 43. Further, the image scanning device 12 has the attachment section 43. The second image scanning unit 30 can be attached to the attachment section 43. The attachment section 43 is provided on one end portion 30A side and on the other end portion 30B side of the holding section 40.

The attachment section 43 has a first attachment section 43A. The first attachment section 43A is provided on the one end portion 30A side. The first engagement portion 31A is capable of engaging the first attachment section 43A. By engaging the first attachment section 43A and the first engagement portion 31A, one end portion 30A of the second image scanning unit 30 is attached to the first attachment section 43A. The first attachment section 43A may be an engagement groove.

Figure 8:
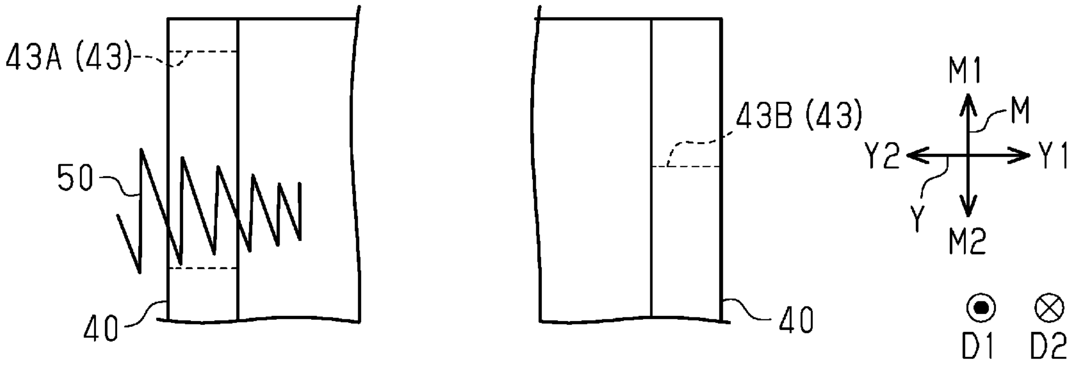
FIG. 8 is a schematic diagram showing the second image scanning unit and a holding section.
Figure 9:
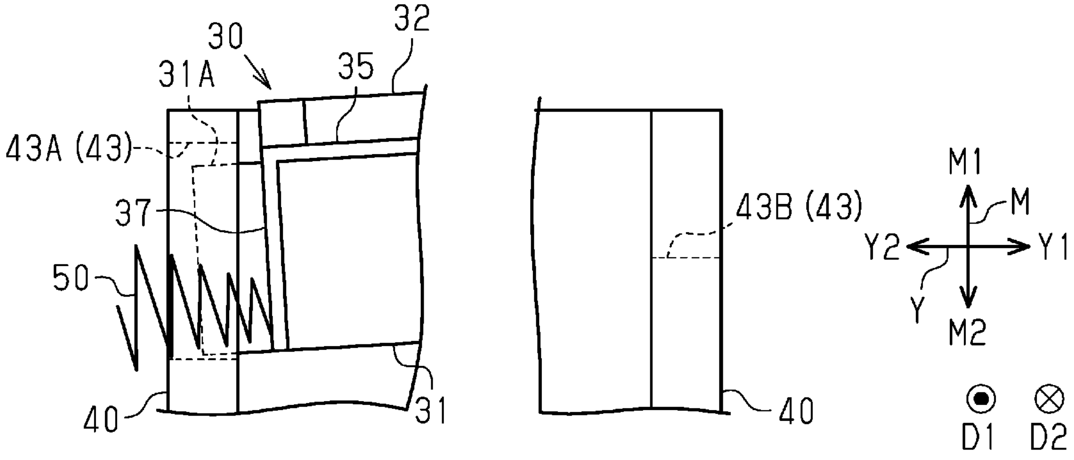
FIG. 9 is another schematic diagram showing the second image scanning unit and the holding section.
Figure 10:
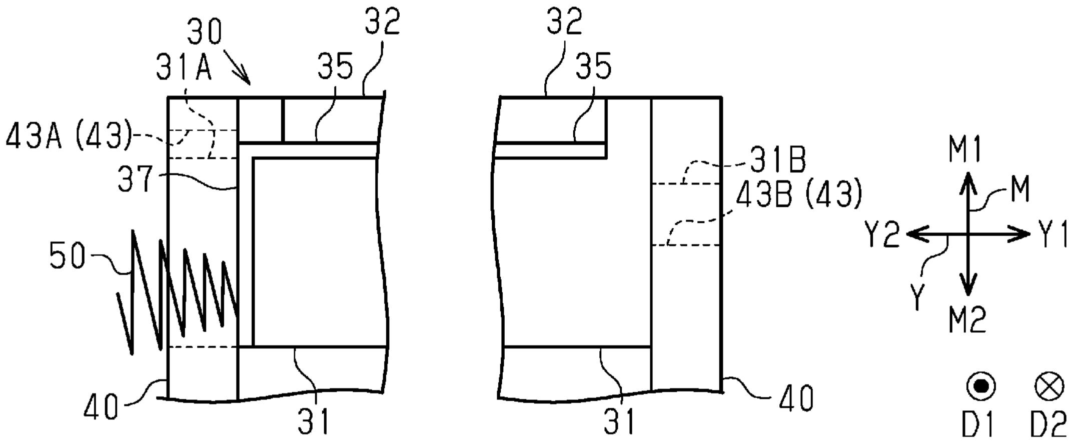
FIG. 10 is still another schematic diagram showing the second image scanning unit and the holding section.

As shown in FIGS. 8 to 10, the attachment section 43 has a second attachment section 43B. The second attachment section 43B is provided on the other end portion 30B side. The second engagement portion 31B is capable of engaging the second attachment section 43B. By engaging the second attachment section 43B and the second engagement portion 31B, the other end portion 30B of the second image scanning unit 30 is attached to the second attachment section 43B. The second attachment section 43B may be an engagement groove.

Figure 6:
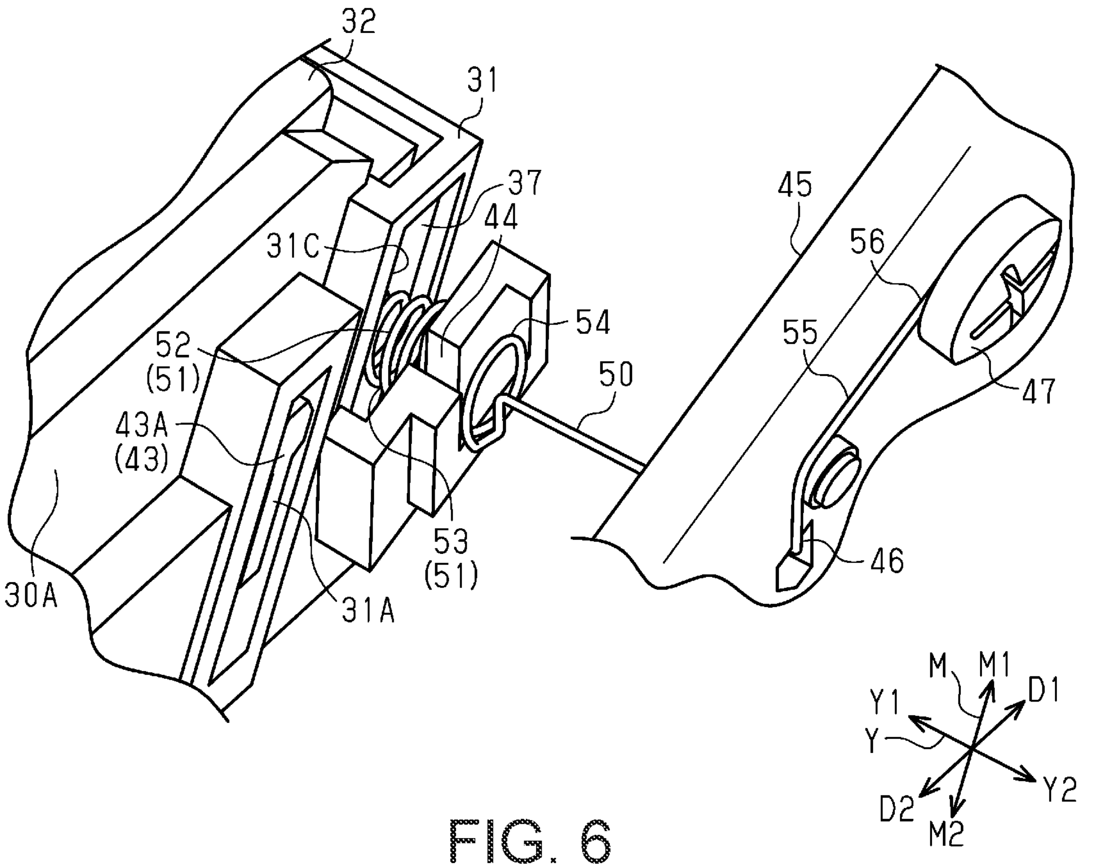
FIG. 6 is a perspective diagram showing the second image scanning unit and a first conductive section.

As shown in FIG. 6, the holding section 40 has a holding groove 44. The holding groove 44 is provided in the one end portion 30A side of the holding section 40. The holding groove 44 can hold the first conductive section 50. When the second image scanning unit 30 is attached to the holding section 40, the holding groove 44 is located further in the second width direction Y2 than is the contacted section 37.

The image scanning device 12 has a metal frame 45. More specifically, the automatic feeding section 13 has the metal frame 45. The metal frame 45 is electrically conductive. The metal frame 45 may be capable of holding a plurality of rollers 22. The metal frame 45 has a through hole 46. The through hole 46 extends in the width direction Y. A fastening member 47 is fastened to the metal frame 45.

First Conductive Section 50

Figure 7:
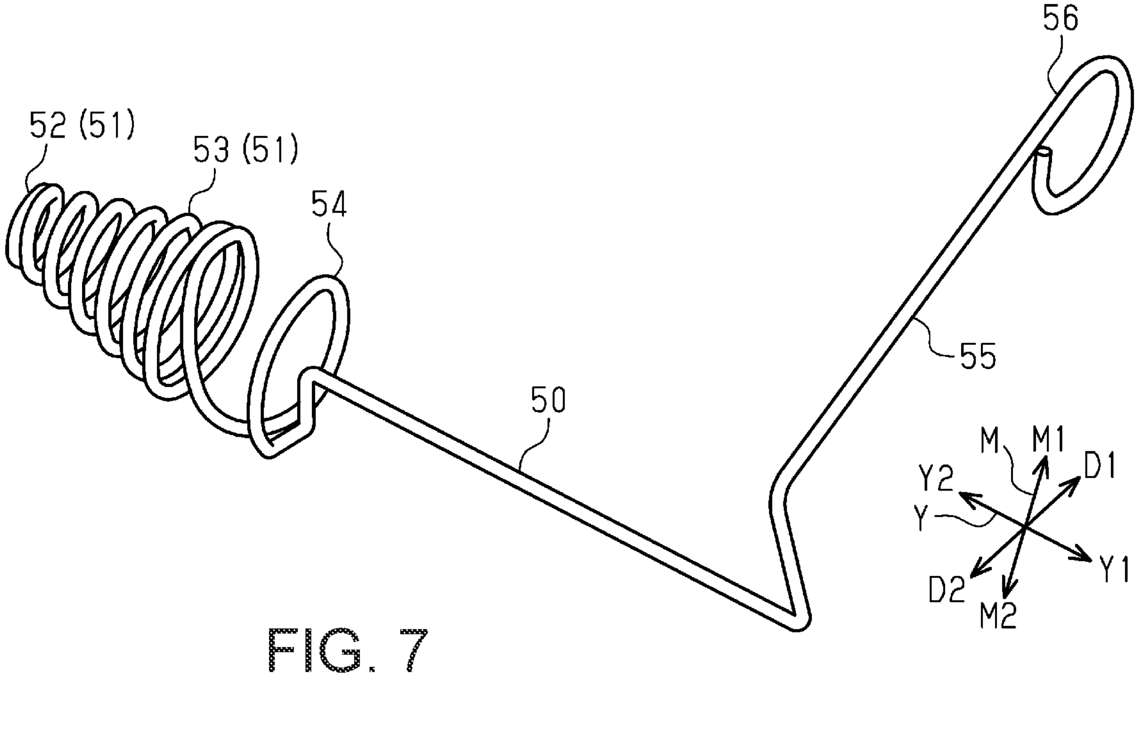
FIG. 7 is a perspective diagram showing the first conductive section.

As shown in FIGS. 6 and 7, the image scanning device 12 has a first conductive section 50. The first conductive section 50 is made of metal. When the second image scanning unit 30 is attached to the holding section 40, the first conductive section 50 contacts the contacted section 37. In this way, the first conductive section 50 is electrically conductive to the second image scanning unit 30.

The first conductive section 50 has an elastic section 51. The elastic section 51 is located at a tip end portion of the first conductive section 50. The elastic section 51 can be elastically deformed. The elastic section 51 may be a coil spring.

The elastic section 51 may have a sliding section 52 and a pressing section 53. The sliding section 52 is provided at a tip end portion of the elastic section 51. The sliding section 52 can slide in a direction that intersects the width direction Y. In particular, the sliding section 52 can slide in the displacement directions M of the second image scanning unit 30.

The pressing section 53 is located closer to the base end portion than is the sliding section 52. The pressing section 53 presses the sliding section 52 toward the contacted section 37. In this way, the sliding section 52 follows the displacement of the second image scanning unit 30 and maintains a state where the sliding section 52 is in contact with the contacted section 37 by presser applied by the pressing section 53. In other words, the elastic section 51 maintains electrical conductivity with the second document glass 32 by following the displacement of the second image scanning unit 30 and by maintaining a state where the elastic section 51 is in contact with the contacted section 37 by deforming elastically.

The first conductive section 50 has a positioning section 54, an extension section 55, and a fastening section 56. The positioning section 54 is located closer to the base end portion than is the pressing section 53. The positioning section 54 is positioned in the holding groove 44 of the holding section 40. In this way, the holding section 40 is configured to hold the elastic section 51. In other words, the holding section 40 is configured to hold the pressing section 53.

The extension section 55 is located closer to the base end portion than is the positioning section 54. The extension section 55 is located closer to the tip end portion than is the fastening portion 56. The extension section 55 is provided so as to connect the positioning section 54 and the fastening portion 56. The extension section 55 is inserted into the through hole 46. The extension section 55 extends along the metal frame 45. The fastening section 56 is fastened to the metal frame 45 by a fastening member 47.

In this way, the first conductive section 50 can follow the displacement of the second image scanning unit 30. The first conductive section 50 maintains electrical conductivity with the second document glass 32 by maintaining a state where the first conductive section 50 is in contact with the contacted section 37 by following the displacement of the second image scanning unit 30. In other words, the first conductive section 50 maintains electric conductivity with the second document glass 32 by following the displacement of the second image scanning unit 30 and by maintaining a state where the first conductive section 50 is in contact with the second conductive section 35.

Method of Attaching and Detaching Second Image Scanning Unit 30

A method of attaching and detaching the second image scanning unit 30 will be described with reference to FIGS. 8 to 10.

As shown in FIG. 8, the first conductive section 50 is held by the holding section 40. When the second image scanning unit 30 is not attached to the holding section 40, a length of the first conductive section 50 is at its default length.

Next, as shown in FIG. 9, with the second image scanning unit 30 tilted, insert the one end portion 30A of the second image scanning unit into the first attachment section 43A. Specifically, the first engagement portion 31A of the one end portion 30A is engaged with the first attachment section 43A. By this, the one end portion 30A of the second image scanning unit 30 is attached to the holding section 40.

In this case, the contacted section 37 presses the first conductive section 50 in the second width direction Y2. By this, the first conductive section 50 biases the contacted section 37 in the first width direction Y1 in a state where the first conductive section 50 is in contact with the contacted section 37. A connection cable may then be connected to the second image scanning unit 30.

Next, as shown in FIG. 10, with the one end portion 30A inserted into the first attachment section 43A, the other end portion 30B of the second image scanning unit 30 is inserted into the second attachment section 43B. Specifically, while the first engagement portion 31A of the one end portion 30A is engaged with the first attachment section 43A, the second engagement portion 31B of the other end portion 30B is engaged with the second attachment section 43B. By this, the other end portion 30B of the second image scanning unit 30 is attached to the holding section 40. In this case, the first conductive section 50 maintains the state where the first conductive section is in contact with the contacted section 37.

As described above, the one end portion 30A of the second image scanning unit 30 is supported by the holding section 40 while the contacted section 37 is in contact with the first conductive section 50. Then, by attaching and detaching the other end portion 30B to and from the holding section 40, the second image scanning unit 30 can be attached to and detached from the holding section 40.

Further, the second image scanning unit 30 can displace toward the first displacement direction M1 by the elastic force of the elastic member 42 in a state where the second image scanning unit 30 is attached to the holding section 40. Then, the second image scanning unit 30 is positioned in the displacement directions M by contacting the contact surface (not shown). In this case, the first conductive section 50 can maintain the state where the first conductive section 50 is in contact with the contacted section 37 by following the displacement of the second image scanning unit 30.

On the other hand, when detaching the second image scanning unit 30 from the holding section 40, the procedure is reverse of that for attaching the second image scanning unit 30 to the holding section 40. When the second image scanning unit 30 is removed from the holding section 40, the length of the first conductive section 50 become at its default length, and the state where the first conductive section 50 is held by the holding section 40 is maintained. As described above, it is not necessary to remove the first conductive section 50 from the holding section 40 when the second image scanning unit 30 is attached and detached.

Operations and Effects of First Embodiment

The operations and effects of the first embodiment will be described.

1. The second image scanning unit 30 can displace along the displacement directions M. By this, it is possible to have diversity in the type of document which is the object of image scanning, and also to adjust the tolerances of the second image scanning unit 30. Therefore, the scanning quality of the image can be improved.

Based on this configuration, the first conductive section 50 can follow the displacement of the second image scanning unit 30. The first conductive section 50 maintains electrical conductivity with the second document glass 32 by maintaining a state where the first conductive section 50 is in contact with the second conductive section 35 by following the displacement of the second image scanning unit 30. According to this configuration, even when the second image scanning unit 30 is displaced along the displacement directions M, the first conductive section 50 can maintain electrical conductivity with the second conductive section 35 by following the displacement of the second image scanning unit 30. By this, the first conductive section 50 can appropriately maintain electrical conductivity with the second document glass 32. Therefore, the charging of the second document glass 32 can be appropriately suppressed.

2. The second image scanning unit 30 has the unit housing 31 that is not electrically conductive with the second document glass 32. The unit housing 31 houses at least the second conductive section 35. The second conductive section 35 has the contacted section 37 that is exposed from the unit housing 31 in the first width direction Y1 side. The first conductive section 50 maintains electrical conductivity with the second document glass 32 by maintaining a state where the first conductive section 50 is in contact with the contacted section 37 by following the displacement of the second image scanning unit 30. According to this configuration, the load on the displacement of the second image scanning unit 30 can be suppressed. By this, the second image scanning unit 30 can be appropriately displaced. Therefore, the scanning quality of the image can be improved. Further, the second image scanning unit 30 can be reduced in size in the displacement directions M.

3. The first conductive section 50 has the elastic section 51 that is configured to deform elastically. The elastic section 51 maintains electrical conductivity with the second document glass 32 by deforming elastically to maintain a state where the elastic section 51 is in contact with the contacted portion 37 by following the displacement of the second image scanning unit 30. According to this configuration, even when the second image scanning unit 30 is displaced along the displacement directions M, electrical conductivity between the elastic section 51 and the second document glass 32 can be properly maintained by a simple configuration using the elastic section 51. Therefore, the charging of the second document glass 32 can be appropriately suppressed.

4. The image scanning device 12 has the holding section 40 that holds the elastic section 51. According to this configuration, even when the second image scanning unit 30 is displaced along the displacement directions M, the first conductive section 50 can maintain proper electrical conductivity with the second document glass 32 by holding the elastic section 51 and by making proper contact between the elastic section 51 and the contacted section 37. Therefore, the charging of the second document glass 32 can be appropriately suppressed.

In particular, the second image scanning unit 30 can be attached and detached while the first conductive section 50 is held by the holding section 40. By this, it is possible to improve the workability of attaching and detaching the second image scanning unit 30.

5. The elastic section 51 is the coil spring. The elastic section 51 has the sliding section 52 that can slid in the displacement directions M, and the pressing section 53 that presses the sliding section 52 toward the contacted section 37. The sliding section 52 maintains a state where the sliding section 52 is in contact with the contacted section 37 by following the displacement of the second image scanning unit 30, and the holding section 40 holds the pressing section 53. According to this configuration, even when the second image scanning unit 30 is displaced along the displacement directions M, the elastic section 51 and the contacted section 37 can be properly contacted by pressing the sliding section 52 toward the contacted section 37 by the pressing section 53. By this, an appropriately electric conductivity between the elastic section 51 and the second document glass 32 can be maintained. Therefore, the charging of the second document glass 32 can be appropriately suppressed.

Further, the holding section 40 can receive a reaction force from the second image scanning unit 30 against the force of the pressing section 53. By this, even when the pressing force of the pressing section 53 is increased, the pressing section 53 can be held stably.

6. The holding section 40 holds the second image scanning unit 30 displaceably. According to this configuration, the holding section 40 can displaceably hold the second image scanning unit 30 in addition to the elastic section 51. By this, the number of parts can be reduced and the second image scanning unit 30 can be held stably, compared to a configuration which has separate holding members for the elastic section 51 and for the second image scanning unit 30.

7. In the related art, it is desired to improve the workability of attaching and detaching the image scanning unit. Therefore, the one end portion 30A of the second image scanning unit 30 is supported by the first attachment section 43A while the contacted section 37 is in contact with the first conductive section 50. Then, by attaching and detaching the other end portion 30B to and from the second attachment section 43B, the second image scanning unit 30 can be attached to and detached from the attachment section 43. According to this configuration, the second image scanning unit 30 can be easily attached to and detached from the attachment section 43. By this, it is possible to improve the workability of attaching and detaching the second image scanning unit 30.

Modifications

This embodiment can be implemented with the following modifications. This embodiment and the following modifications can be implemented in combination with each other within a range that is not technically contradictory.

The contacted section 37 may be exposed from the unit housing 31 in the opposite direction D2 side. The contacted section 37 may be exposed from the unit housing 31 toward the first width direction Y1. The contacted section 37 may be exposed from the unit housing 31 toward the transport direction D1. The contacted section 37 may be exposed from the unit housing 31 toward the opposite direction D2. The contacted section 37 may be exposed from the unit housing 31 toward the second displacement direction M2. The contacted section 37 may be exposed from the unit housing 31 toward the first displacement direction M1 as long as it is in a region where the image can be scanned from the document by the scanning section 33.

The unit housing 31 may have an opening instead of a notch portion 31C if it is configured to expose the contacted section 37 to the outside. In other words, the unit housing 31 is only required to have an exposed region that exposes the contacted section 37 to the outside.

The elastic section 51 is not limited to the coil spring, but may be, for example, a plate spring, as long as it is electrically conductive. The first conductive section 50 may be an electrically conductive harness, as long as it is an electrically conductive member that can follow the movement of the second image scanning unit 30. The first conductive section 50 may not be held by the holding section 40. The first conductive section 50 may be held by the second image scanning unit 30 itself.

Although this disclosure is applied to the second image scanning unit 30, this disclosure may be applied to the first image scanning unit 23. The image scanning device 12 is equipped with the first image scanning unit 23 and the second image scanning unit 30, but it may be equipped with either one of the first image scanning unit 23 and the second image scanning unit 30.

Any type of document is acceptable as the type of document. In addition to printed objects, the type of document may be a booklet, or a carrier sheet for transporting a booklet in between.

The image scanning device 12 may be mounted on other devices besides the multifunction device 10. Specifically, the image scanning device 12 may be mounted on a post-processing device that performs post-processing related to the medium after it is recorded. The image scanning device 12 may be mounted on an intermediate device provided between the recording device and the post-processing device. The image scanning device 12 may be equipped with a scanning function without a recording function. In other words, the image scanning device 12 may be independent of other devices.

The phrase "at least any" as used in this specification means higher than one of the desired options. As an example, the phrase "at least any" as used in this specification means only one option or both of the two options if the number of options is two. As another example, the phrase "at least any" as used in this specification means only one option or any combination of two or more options if the number of options is three or more.

Note

The following is a description of the technical concept and its operations and effects that can be understood from the above-mentioned embodiments and modified examples. This technical concept and its operations and effects can be combined with each other to the extent that they do not contradict each other technically.

A. The image scanning device includes a transport section that transports a document along a transport path; an image scanning unit that is configured to scan an image from the document transported by the transport section; and a first conductive section electrically conductible with the image scanning unit, wherein the image scanning unit has a scanning section that is configured to scan the image from the document transported by the transport section, a glass plate that is configured to contact the document between the scanning section and the transport path, and a second conductive section electrically conductive with the glass plate, the image scanning unit is configured to displace along a displacement direction that intersects the transport path, and the first conductive section is configured to follow a displacement of the image scanning unit and to maintain electrical conductivity with the glass plate by maintaining a state where the first conductive section is in contact with the second conductive section by following the displacement of the image scanning unit.

According to this configuration, even when the image scanning unit is displaced along the displacement direction, the first conductive section can maintain a state where the first conductive section is in contact with the second conductive section by following the displacement of the image scanning unit. By this, the first conductive section can appropriately maintain electrical conductivity with the glass plate. Therefore, the charging of the glass plate can be appropriately suppressed.

B. The above image scanning device may be configured such that the image scanning unit has a unit housing that is not electrically conductive with the glass plate, the unit housing houses at least the second conductive section, the second conductive section has a contacted section which is exposed from the unit housing at a first intersection direction side amongst intersection directions that intersect the displacement direction, and the first conductive section maintains electrical conductivity with the glass plate by maintaining a state where the first conductive section is in contact with the contacted section by following displacement of the image scanning unit.

According to this configuration, the load on the displacement of the image scanning unit can be suppressed. By this, the image scanning unit can be appropriately displaced. Therefore, the scanning quality of the image can be improved. Further, the image scanning unit can be reduced in size in the displacement direction.

C. The above image scanning device may be configured such that the first conductive section has an elastic section that is configured to deform elastically, and the elastic section maintains electrical conductivity with the glass plate by deforming elastically to maintain a state where the elastic section is in contact with the contacted section by following displacement of the image scanning unit.

According to this configuration, even when the image scanning unit is displaced along the displacement direction, electrical conductivity between the first conductive section and the glass plate can be properly maintained by a simple configuration using the elastic section. Therefore, the charging of the glass plate can be appropriately suppressed.

D. The above image scanning device may further include a holding section that holds the elastic section.

According to this configuration, even when the image scanning unit is displaced along the displacement direction, the first conductive section can maintain proper electrical conductivity with the glass plate by holding the elastic section and making proper contact between the elastic section and the contacted section. Therefore, the charging of the glass plate can be appropriately suppressed.

E. The above image scanning device may be configured such that the elastic section is a coil spring, the elastic section has a sliding section that is configured to slide in the displacement direction and a pressing section that presses the sliding section toward the contacted section, the sliding section maintains a state where the sliding section is in contact with the contacted section by following displacement of the image scanning unit, and the holding section holds the pressing section.

According to this configuration, even when the image scanning unit is displaced along the displacement direction, the elastic section can maintain proper electrical conductivity with the glass plate by pressing the sliding section toward the contacted section and by making proper contact between the elastic section and the contacted section. Therefore, the charging of the glass plate can be appropriately suppressed.

(F) In the above image scanning device, the holding section may hold the image scanning unit displaceably.

According to this configuration, the holding section can displaceably hold the image scanning unit in addition to the elastic section. By this, the number of parts can be reduced and the image scanning unit can be held stably, compared to a configuration which has separate holding members for the elastic section and for the image scanning unit.

(G) The above image scanning device may be configured such that further including an attachment section, wherein the image scanning unit has a one end portion on the first intersection direction side and an other end portion on a second intersection direction side, which is the opposite direction from the first intersection direction, and the one end portion is supported by the attachment section in a state where the contacted section is in contact with the first conductive section, and the image scanning unit is configured to be attached to or detached from the attachment section by attaching or detaching the other end portion to or from the attachment section.

According to this configuration, the image scanning unit can be easily attached to and detached from the attachment section. By this, it possible to improve the workability of attaching and detaching the image scanning unit.

What is claimed is:

1. An image scanning device comprising:
- a transport section that transports a document along a transport path;
- an image scanning unit that is configured to scan an image from the document transported by the transport section; and
- a first conductive section electrically conductible with the image scanning unit, wherein
- the image scanning unit has
- a scanning section that is configured to scan the image from the document transported by the transport section,
- a glass plate that is configured to contact the document between the scanning section and the transport path, and
- a second conductive section electrically conductive with the glass plate,
- the image scanning unit is configured to displace along a displacement direction that intersects the transport path, and
- the first conductive section is configured to follow a displacement of the image scanning unit and to maintain electrical conductivity with the glass plate by maintaining a state where the first conductive section is in contact with the second conductive section by following the displacement of the image scanning unit,
- wherein the glass plate is grounded via the first conductive section and the second conductive section.

2. The image scanning device according to claim 1, wherein
- the image scanning unit has a unit housing that is not electrically conductive with the glass plate,
- the unit housing houses at least the second conductive section,
- the second conductive section has a contacted section which is exposed from the unit housing at a first intersection direction side amongst intersection directions that intersect the displacement direction, and
- the first conductive section maintains electrical conductivity with the glass plate by maintaining a state where the first conductive section is in contact with the contacted section by following displacement of the image scanning unit.

3. The image scanning device according to claim 2, wherein
- the first conductive section has an elastic section that is configured to deform elastically, and
- the elastic section maintains electrical conductivity with the glass plate by deforming elastically to maintain a state where the elastic section is in contact with the contacted section by following displacement of the image scanning unit.

4. The image scanning device according to claim 3, further comprising:
- a holding section that holds the elastic section.

5. The image scanning device according to claim 4, wherein
- the elastic section is a coil spring,
- the elastic section has a sliding section that is configured to slide in the displacement direction and a pressing section that presses the sliding section toward the contacted section,
- the sliding section maintains a state where the sliding section is in contact with the contacted section by following displacement of the image scanning unit, and
- the holding section holds the pressing section.

6. The image scanning device according to claim 4, wherein
- the holding section holds the image scanning unit so that it is displaceable.

7. The image scanning device according to claim 2, further comprising:
- an attachment section, wherein
- the image scanning unit has a one end portion on the first intersection direction side and an other end portion on a second intersection direction side, which is the opposite direction from the first intersection direction, and
- the one end portion is supported by the attachment section in a state where the contacted section is in contact with the first conductive section, and the image scanning unit is configured to be attached to or detached from the attachment section by attaching or detaching the other end portion to or from the attachment section.

8. The image scanning device according to claim 1, further comprising:
- a metal frame,
- wherein the glass plate is electrically conductive with the metal frame via the second conductive section and the first conductive section.

* * * * *